United States Patent
Renninger et al.

(10) Patent No.: US 10,513,979 B2
(45) Date of Patent: Dec. 24, 2019

(54) ASYMMETRIC INLET PARTICLE SEPARATOR SYSTEM

(71) Applicant: General Electric Company, Schenectady, NY (US)

(72) Inventors: Courtney Ann Renninger, Ipswich, MA (US); Brian Benscoter Roberts, Ipswich, MA (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 15/414,251

(22) Filed: Jan. 24, 2017

(65) Prior Publication Data
US 2018/0209340 A1   Jul. 26, 2018

(51) Int. Cl.
  *B01D 45/04*  (2006.01)
  *B01D 45/08*  (2006.01)
  *B04C 3/00*   (2006.01)
  *B04C 5/06*   (2006.01)
  (Continued)

(52) U.S. Cl.
  CPC .............. *F02C 7/052* (2013.01); *B01D 45/04* (2013.01); *F05D 2220/90* (2013.01)

(58) Field of Classification Search
  CPC .... B01D 45/04; B01D 45/08; B01D 46/0031; B01D 50/002; B01D 50/00; F02C 7/052; B04C 3/00; B04C 5/06; B04C 5/14; B04C 5/081; B04C 5/103; B64C 13/00; F01M 13/04; F24F 2221/46; Y02T 50/56; F05D 2220/90
  USPC .......... 55/423, 466, 440–446, 462–465, 450, 55/434, 306, 385.3; 95/8, 31; 96/417; 60/39.092; 137/15.1
  See application file for complete search history.

(56) References Cited

U.S. PATENT DOCUMENTS

| | | | |
|---|---|---|---|
| 3,832,086 A | * | 8/1974 | Hull, Jr. .................... B04C 3/06 137/15.1 |
| 3,993,463 A | * | 11/1976 | Barr ........................ B01D 45/16 55/306 |
| 4,527,387 A | | 7/1985 | Lastrina et al. |

(Continued)

FOREIGN PATENT DOCUMENTS

EP   2708272 A1    3/2014
EP   1 942 258 B1  11/2015

OTHER PUBLICATIONS

International Search Report and Written Opinion issued in connection with corresponding PCT Application No. PCT/US2017/061018 dated Feb. 27, 2018.

*Primary Examiner* — Minh Chau T Pham
(74) *Attorney, Agent, or Firm* — General Electric; James Reed

(57) ABSTRACT

An asymmetric inlet particle separator system (AIPS) includes a bifurcated duct system that defines an inlet for receiving inlet air. The bifurcated duct system includes a core air channel and a scavenge air channel and is configured to separate the inlet air into core air and scavenge air. The scavenge air channel includes a first plurality of turning vanes configured to turn the scavenge air in a first direction and a second plurality of turning vanes configured to turn the scavenge air in a second direction. The AIPS also includes an asymmetric scroll coupled to the scavenge air channel. The asymmetric scroll includes a first arm having a first arm length and a second arm having a second arm length that is different than the first arm length.

18 Claims, 5 Drawing Sheets

(51) Int. Cl.
*B04C 5/14* (2006.01)
*F02C 7/052* (2006.01)

(56) References Cited

U.S. PATENT DOCUMENTS

| | | | | |
|---|---|---|---|---|
| 4,702,071 A * | 10/1987 | Jenkins | | F02C 7/052 415/121.2 |
| 6,508,052 B1 * | 1/2003 | Snyder | | B01D 45/08 137/15.1 |
| 6,702,873 B2 * | 3/2004 | Hartman | | B01D 46/0043 55/434 |
| 7,296,395 B1 | 11/2007 | Hartman et al. | | |
| 7,608,122 B2 * | 10/2009 | Snyder | | F02C 7/052 55/306 |
| 7,927,408 B2 | 4/2011 | Sheoran et al. | | |
| 8,943,791 B2 | 2/2015 | Tibbott et al. | | |
| 8,968,437 B2 * | 3/2015 | Kline | | F02C 7/05 55/306 |
| 9,206,740 B2 | 12/2015 | Wong et al. | | |
| 9,272,293 B2 * | 3/2016 | Bizzarro | | B04C 5/06 |
| 9,314,723 B2 | 4/2016 | Judd et al. | | |
| 2003/0024233 A1 * | 2/2003 | Snyder | | B01D 45/08 60/39.092 |
| 2006/0021356 A1 * | 2/2006 | Milde | | B01D 45/16 62/93 |
| 2009/0283079 A1 * | 11/2009 | Tsunoda | | F02M 35/024 123/65 PD |
| 2011/0226675 A1 | 9/2011 | Holden et al. | | |
| 2013/0291726 A1 * | 11/2013 | Kline | | F02C 7/055 95/267 |
| 2014/0076159 A1 | 3/2014 | Judd et al. | | |
| 2015/0352477 A1 * | 12/2015 | Fujii | | B01D 45/14 55/447 |
| 2016/0045923 A1 * | 2/2016 | Correia | | F01D 5/081 55/392 |
| 2016/0090912 A1 * | 3/2016 | Joshi | | F02C 7/052 96/372 |
| 2016/0312698 A1 * | 10/2016 | Judd | | F02C 7/052 |
| 2016/0325214 A1 | 11/2016 | Davis | | |

* cited by examiner

ASYMMETRIC INLET PARTICLE SEPARATOR SYSTEM

BACKGROUND

The subject matter disclosed herein relates to an inlet particle separator system and, more particularly, to an asymmetric inlet particle separator system.

Generally, it is desirable that aircraft engines, such as aircraft gas turbine engines, do not ingest airborne particles, such as sand, dust, and ice. However, many known aircraft, such as vertical takeoff and landing aircraft, are designed to operate in conditions during which engine exposure to airborne particles is unavoidable. Under such conditions, particles may become entrained in an engine air intake flow and may interfere with operation of the aircraft engine.

Various inlet particle separator (IPS) systems have been developed for use with different types of gas turbine engines. Conventional IPS systems include (1) a separator assembly, and (2) a single-arm collector assembly that is coupled to the separator assembly. In operation, the separator assembly separates inlet air into core air and scavenge air, while the collector assembly collects and vents the scavenge air overboard.

Many conventional collector assemblies are continuous about a designated circumference. Such collector assemblies take up a large amount of space within the engine and typically displace a variety of other system components, such as, for example, various actuators, gearboxes, tanks, blowers, and the like.

BRIEF DESCRIPTION

In one aspect, an asymmetric inlet particle separator system (AIPS) for an engine is provided. The AIPS includes a bifurcated duct system that defines an inlet for receiving inlet air. The bifurcated duct system includes a core air channel and a scavenge air channel and is configured to separate the inlet air into core air and scavenge air, such that the core air flows into the core air channel and the scavenge air flows into the scavenge air channel. The scavenge air channel includes a first plurality of turning vanes configured to turn the scavenge air in a first direction within the scavenge air channel, and a second plurality of turning vanes configured to turn the scavenge air in a second direction within the scavenge air channel. The AIPS also includes an asymmetric scroll coupled to the scavenge air channel. The asymmetric scroll includes a first arm having a first arm length and configured to receive the scavenge air from the first plurality of turning vanes, and a second arm having a second arm length that is different than the first arm length and configured to receive the scavenge air from the second plurality of turning vanes.

In another aspect, an asymmetric scroll configured to be coupled to a bifurcated duct system is provided. The asymmetric scroll includes a first arm having a first arm length and configured to receive inlet air from a first plurality of turning vanes of the bifurcated duct system, and a second arm having a second arm length that is different than the first arm length and configured to receive inlet air from a second plurality of turning vanes of the bifurcated duct system.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to an asymmetric particle separator system that includes a bifurcated duct system and an asymmetric scroll coupled to the bifurcated duct system. Scavenge air is separated from inlet air at an inlet by the bifurcated duct system, turned in opposite directions about a circumference of a scavenge channel of the bifurcated duct system, and directed into the asymmetric scroll for discharge as exhaust gas.

Figure 1:
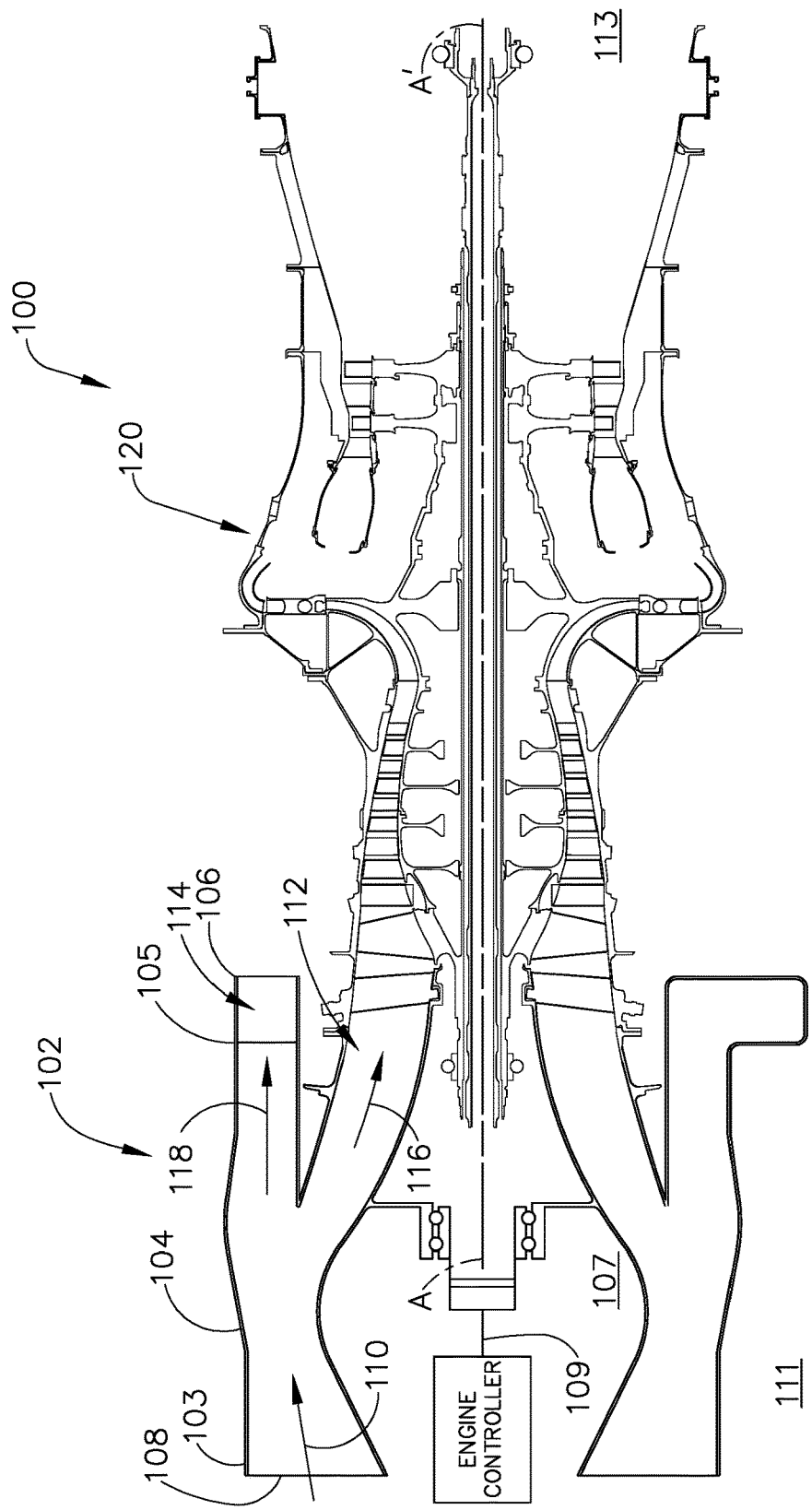
FIG. 1 is a cross-sectional view of an aircraft gas turbine engine that includes an exemplary asymmetric inlet particle separator system.

FIG. 1 is a cross-sectional view of an aircraft gas turbine engine 100 that includes an exemplary asymmetric inlet particle separator system (AIPS) 102. An axis A-A' extends through engine 100 and defines a centerline 109 of engine 100. Engine 100 also includes a forward end 111 and an aft end 113.

AIPS 102 includes a bifurcated duct system 104 and an asymmetric scroll 106 that is coupled to bifurcated duct system 104. Bifurcated duct system 104 includes a forward end 103 and an aft end 105. In the exemplary embodiment, at least one fan or blower powered by engine 100 draws air into AIPS 102. A central cavity 107 is disposed within AIPS 102. Central cavity 107 may include a variety of engine hardware, including, for example, one or more fans or blowers. Inlet air 110 does not flow within central cavity 107.

Forward end 103 of bifurcated duct system 104 defines an inlet 108 that receives inlet air 110. Bifurcated duct system 104 includes a core air channel 112 and a scavenge air channel 114. Scavenge air channel 114 is disposed radially outward of core air channel 112.

In operation, bifurcated duct system 104 separates inlet air 110 into core air 116 within core air channel 112 and scavenge air 118 within scavenge air channel 114. Scavenge air channel 114 is substantially in alignment with inlet 108, while core air channel 112 dips radially inward toward an engine core 120. Thus, inlet air 110 that is entrained with particles flows as scavenge air 118 into scavenge air channel 114 under the inertia of the particles entrained within the flow, while cleaner core air 116 is more easily diverted into core air channel 112.

Figure 2:
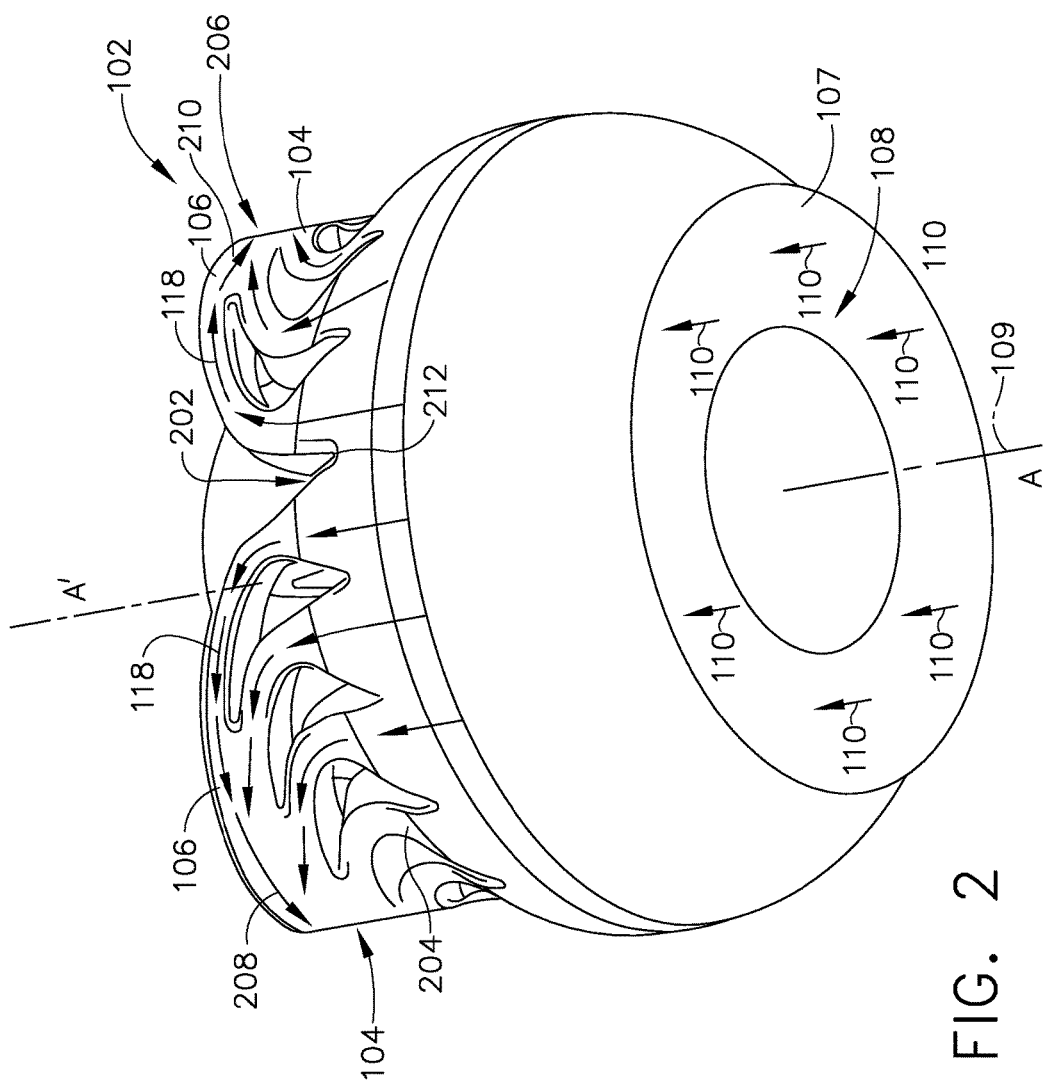
FIG. 2 is a perspective view of the exemplary asymmetric inlet particle separator system shown at FIG. 1.

FIG. 2 is a perspective view of AIPS 102. As shown, bifurcated duct system 104 includes a flow splitting vane 202, a first plurality of turning vanes 204, and a second plurality of turning vanes 206. Turning vanes 204 are configured to turn scavenge air 118 in a first direction 208 within scavenge air channel 114. Similarly, turning vanes 206 are configured to turn scavenge air 118 in a second direction 210 within scavenge air channel 114. Flow splitting vane 202 is substantially Y-shaped and is interposed between turning vanes 204 and turning vanes 206 and marks a boundary 212 between turning vanes 204 and turning vanes 206.

Figure 3:
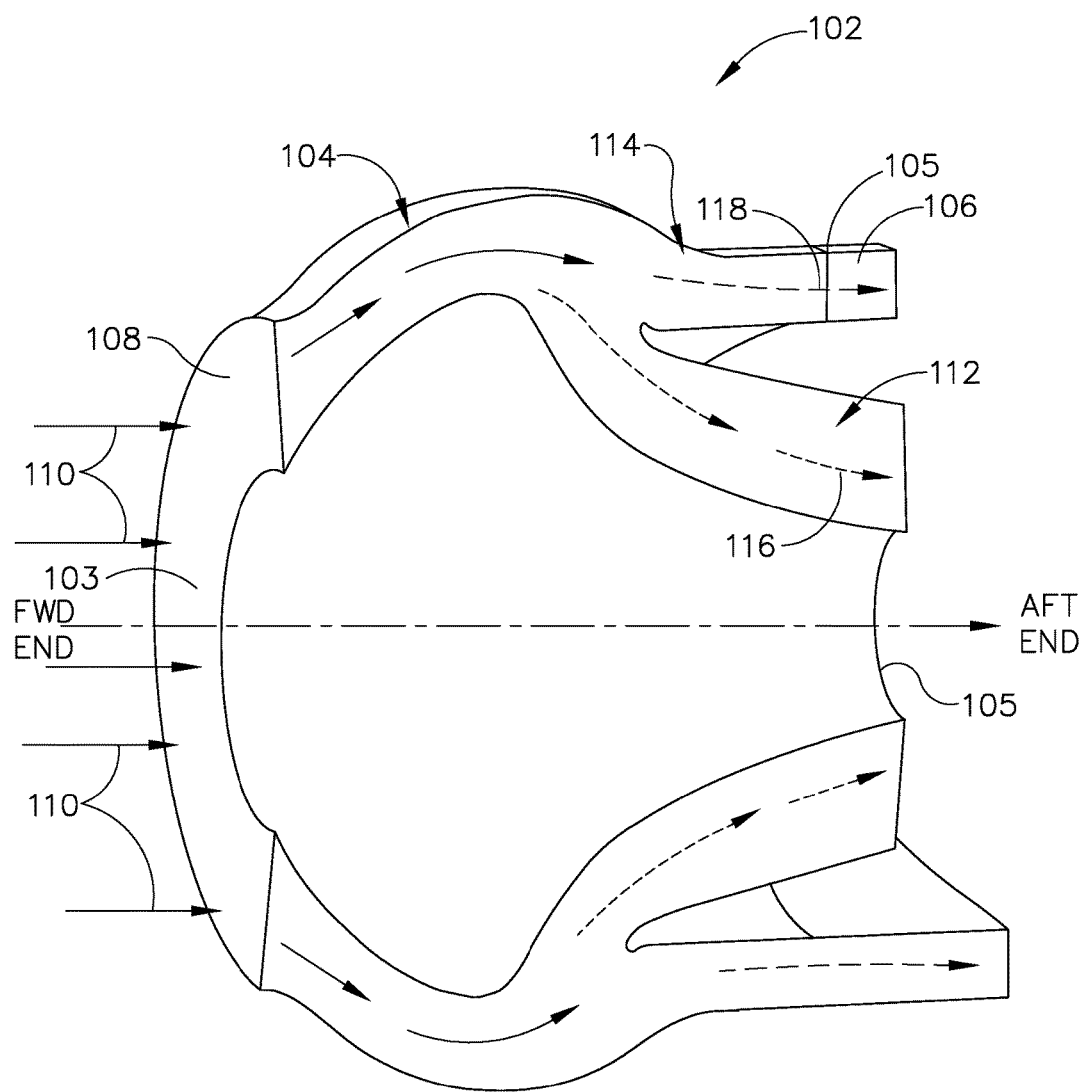
FIG. 3 is a cross-sectional view of the exemplary asymmetric inlet particle separator system shown at FIG. 2.

FIG. 3 is a cross-sectional view of AIPS 102. As described above, asymmetric scroll 106 is coupled to bifurcated duct system 104. In the exemplary embodiment, asymmetric scroll 106 is coupled to bifurcated duct system 104 at aft end 105 of bifurcated duct system 104. More particularly, asymmetric scroll 106 is coupled at aft end 105 to scavenge air channel 114 and is configured to receive scavenge air 118 from scavenge air channel 114.

Figure 4:
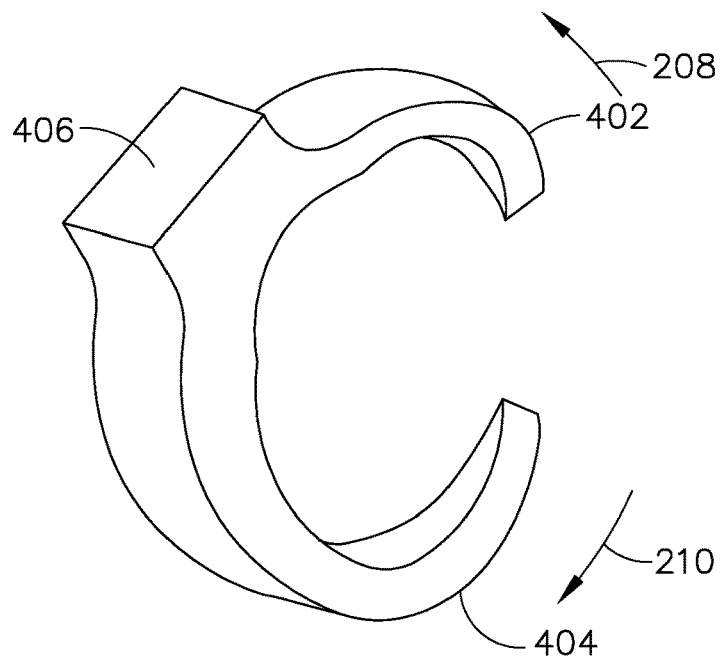
FIG. 4 is a perspective view of an exemplary scroll of the asymmetric inlet particle separator system shown at FIG. 3.

FIG. 4 is a perspective view of asymmetric scroll 106. Asymmetric scroll 106 includes a first arm 402, a second arm 404, and an exhaust port 406. In the exemplary embodiment, first arm 402 receives scavenge air 118 from turning vanes 204, and second arm 404 receives scavenge air 118 from turning vanes 206. Thus, scavenge air 118 flows in first direction 208 within first arm 402 and in second direction 210 within second arm 404. First arm 402 and second arm 404 converge on exhaust port 406, and as scavenge air 118 flows circumferentially within asymmetric scroll 106, scavenge air 118 is vented or thrown overboard via exhaust port 406.

Figure 5:
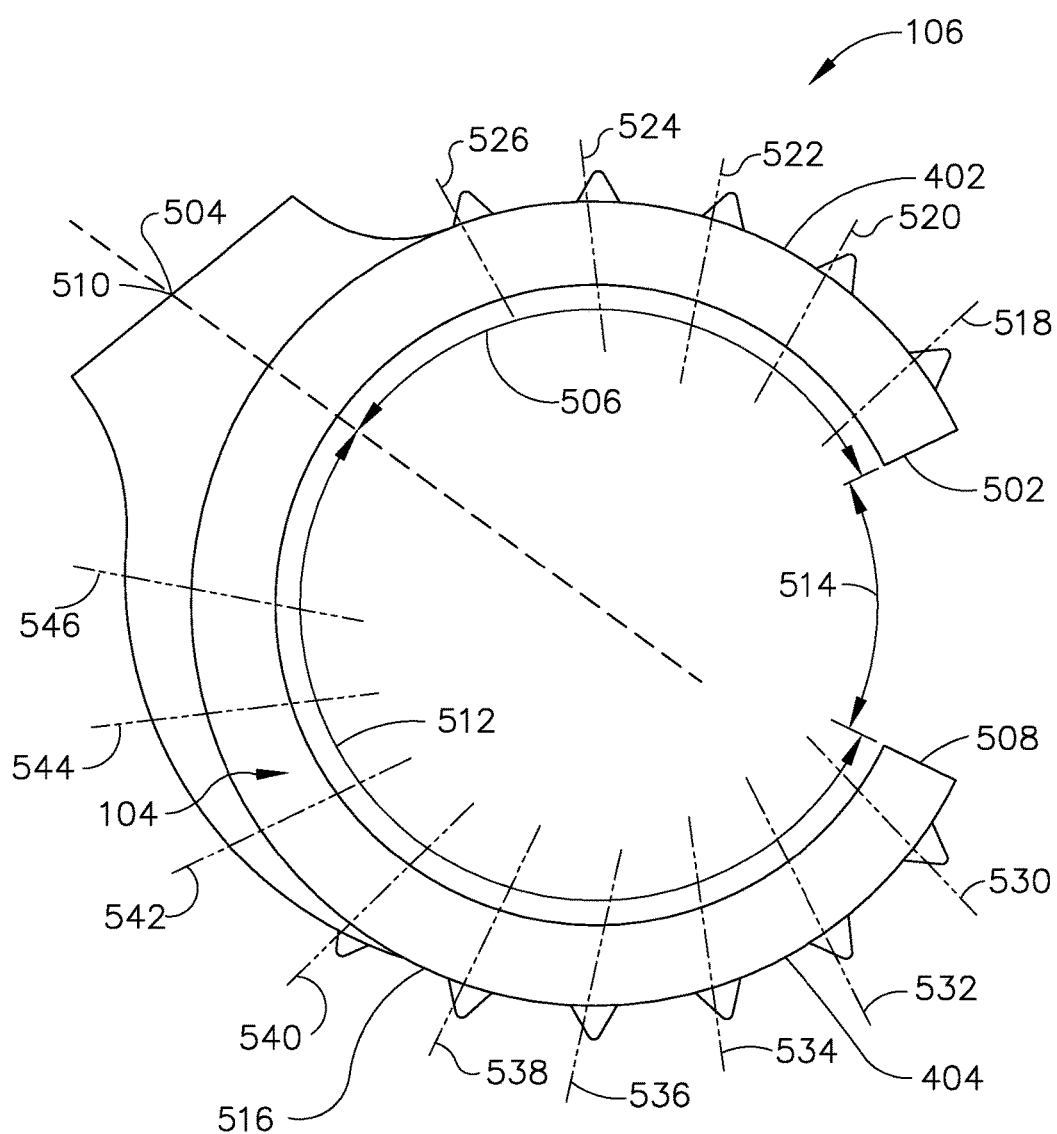
FIG. 5 is a side view of the exemplary scroll shown at FIG. 4.

FIG. 5 is a side view asymmetric scroll 106. As shown, first arm 402 has a first end 502 and a second end 504, which together define a first arm length 506. Similarly, second arm 404 has a first end 508 and a second end 510, which together define a second arm length 512. A space or gap 514 is also defined between first end 502 of first arm 402 and first end 508 of second arm 404. In addition, first arm 402 is coupled at first end 502 to flow splitting vane 202 (shown in FIG. 2), and second arm 404 is coupled at first end 508 to flow splitting vane 202. Thus, flow splitting vane 202 also functions to define gap 514.

In the exemplary embodiment, first arm length 506 is different than second arm length 512. More particularly, asymmetric scroll 106 defines a circumference 516 about which first arm 402 and second arm 404 partially extend. For example, in some embodiments, first arm 402 extends less than one hundred and twenty degrees about circumference 516, and second arm 404 extends less than two hundred and forty degrees about circumference 516. However, in some embodiments, first arm 402 and second arm 404 may be equal to and/or may exceed these dimensions. Thus, asymmetric scroll 106 is asymmetric about circumference 516, in that first arm 402 is different in length than second arm 404.

First arm 402 defines a plurality of first cross-sectional areas at a plurality of first positions, such as first positions, 518, 520, 522, 524, and 526, along first arm length 506. Similarly, second arm 404 defines a plurality of second cross-sectional areas at a plurality of second positions, such as second positions 530, 532, 534, 536, 538, 540, 542, 544, and 546, along second arm length 512. In the exemplary embodiment, first positions 518-526 mark intersections between each of first plurality of turning vanes 204 of bifurcated duct system 104 and asymmetric scroll 106. Similarly, second positions 530-546 mark intersections between each of second plurality of turning vanes 206 of bifurcated duct system 104 and asymmetric scroll 106.

Thus, the cross-sectional area of first arm 402 increases between first end 502 and second end 504. Likewise, the cross-sectional area of second arm 404 increases between first end 508 and second end 510. In other words, the cross-sectional area of first arm 402 increases in first direction 208, and the cross-sectional area of second arm 404 increases in second direction 210. Hence, the cross-sectional areas of each of arms 402 and 404 increase as arms 402 and 404 converge on exhaust port 406.

In operation, and as described above, bifurcated duct system 104 separates inlet air 110 into core air 116 within core air channel 112 and scavenge air 118 within scavenge air channel 114. Inlet air 110 that is entrained with particles flows as scavenge air 118 into scavenge air channel 114 under the inertia of the particles entrained within the flow, while cleaner core air 116 is diverted into core air channel 112.

As scavenge air 118 flows into scavenge air channel 114, first plurality of turning vanes 204 turn scavenge air 118 in first direction 208, and second plurality of turning vanes 206 turn scavenge air 118 in second direction 210, such that scavenge air 118 flows circumferentially in opposite directions within scavenge air channel 114.

Turning vanes 204 and 206 further direct the flow of scavenge air 118, in opposite directions, into first arm 402 and second arm 404 of asymmetric scroll 106. As asymmetric scroll 106 receives scavenge air 118 within arms 402 and 404, scavenge air 118 continues to flow in circumferentially opposite directions, such as first direction 208 and second direction 210, until scavenge air 118 reaches exhaust port 406 and is exhausted or thrown overboard.

Figure 6:
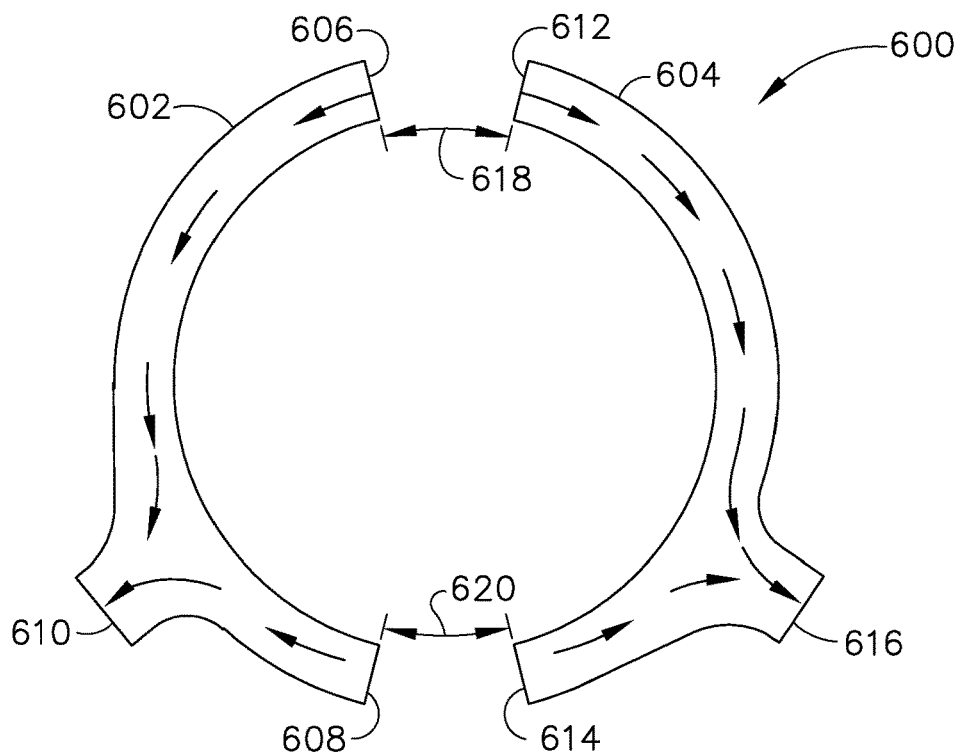
FIG. 6 is a side view of an alternative scroll system.

FIG. 6 is a side view of an alternative scroll system 600. Scroll system 600 includes a first scroll 602 and a second scroll 604. First scroll 602 has a first end 606, a second end 608, and an exhaust port 610. Similarly, second scroll 604 has a first end 612, a second end 614, and an exhaust port 616. A first gap 618 is defined between first end 606 of first scroll 602 and first end 612 of second scroll 604. Similarly, a second gap 620 is defined between second end 608 of first scroll 602 and second end 614 of second scroll 604.

In operation, scroll system 600 is used in conjunction with two bifurcated duct systems 104, each coupled to one of first scroll 602 and second scroll 604, as described above. Scavenge air 118 is diverted by the plurality of bifurcated duct systems 104 uniformly, or substantially uniformly, between first scroll 602 and second scroll 604. In some embodiments, a scroll system may be divided into four scrolls, each having, for example, four exhaust ports, and each defining four gaps. In such an embodiment, scavenge air 118 may be distributed substantially evenly between each of the four scrolls by four bifurcated duct systems 104.

Embodiments of the AIPS 102, as described above, facilitate a variety of flexible design options. For example, peripheral or external equipment, such as actuators, gearboxes, tanks, blowers, and the like can be placed fully or partially within gap 514 and/or gaps 618 and 620. Such equipment may also be placed much closer to engine 100 than in many prior art systems, such as, for example, systems that incorporate a single arm scroll and that do not include such a gap between scroll arms.

For instance, an integrated heat exchanger may be placed in close proximity to engine 100 as well as at a bottom or coolest part of engine 100, because asymmetric scroll 106 can be installed in an orientation with respect to engine 100, such that gap 514 is in alignment with the bottom or coolest part of engine 100, and the integrated heat exchanger placed fully or partially within gap 514. Further, the cross-sectional areas of each scroll arm 402 and 404 are reduced in comparison to the cross-sectional areas required in single arm scroll designs, making AIPS 102 smaller and more compact than many prior art inlet particle separator systems.

Exemplary technical effects of the AIPS described herein include, for example: (a) distribution of scavenge air between a plurality of scroll arms; (b) discontinuous scroll geometries that permit placement of engine peripherals within or about one or more gaps between adjacent scrolls; and (c) reduced scroll cross-sectional areas, allowing for improved space savings and various scroll orientations and options for placement of engine peripherals.

Exemplary embodiments of an asymmetric inlet particle separator system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where inlet particle separation is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An asymmetric inlet particle separator system (AIPS) for an engine, said AIPS comprising:
   a bifurcated duct system comprising:
      an inlet disposed around a centerline that defines an axial direction and is configured to receive inlet air substantially in the axial direction;
      a core air channel; and
      a scavenge air channel configured to separate the inlet air into core air and scavenge air, such that the core air flows into said core air channel and the scavenge air flows into said scavenge air channel;
      a first plurality of turning vanes configured to turn a first portion of the scavenge air from the substantially axial direction to a first circumferential direction relative to the centerline within said scavenge air channel; and
      a second plurality of turning vanes configured to turn a second portion of the scavenge air from the substantially axial direction to a second circumferential direction relative to the centerline opposite said first circumferential direction within said scavenge air channel; and
   an asymmetric scroll coupled to said scavenge air channel, said asymmetric scroll comprising:
      a first arm having a first arm length, said first arm configured to receive the first portion of the scavenge air from said first plurality of turning vanes; and
      a second arm having a second arm length that is different than the first arm length, said second arm configured to receive the second portion of the scavenge air from said second plurality of turning vanes.

2. The AIPS system of claim 1, wherein said first arm comprises a first end and said second arm comprises a second end, and wherein said first end and said second end define a gap between said first arm and said second arm.

3. The AIPS system of claim 2, wherein said gap is configured to accommodate peripheral engine equipment.

4. The AIPS system of claim 1, wherein said scavenge air channel further comprises a flow splitting vane interposed between said first plurality of turning vanes and said second plurality of turning vanes, and wherein said flow splitting vane defines a gap between said first arm and said second arm.

5. The AIPS system of claim 1, wherein said asymmetric scroll comprises an exhaust port configured to receive the scavenge air from each of said first arm and said second arm and direct the scavenge air overboard.

6. The AIPS system of claim 1, wherein said first arm defines a plurality of cross-sectional areas at each of a plurality of positions along the first arm length, and wherein each cross-sectional area of each of the plurality of positions increases in a direction of an exhaust port common to said first arm and said second arm.

7. The AIPS system of claim 6, wherein each of the plurality of positions corresponds to an intersection of said first arm with one of said first plurality of turning vanes.

8. The AIPS system of claim 1, wherein said second arm defines a plurality of cross-sectional areas at each of a plurality of positions along the second arm length, and wherein each cross-sectional area of each of the plurality of positions increases in a direction of an exhaust port common to said second arm and said first arm.

9. The AIPS system of claim 7, wherein each of the plurality of positions corresponds to an intersection of said second arm with one of said second plurality of turning vanes.

10. The AIPS system of claim 1, wherein said asymmetric scroll has a circumference, and wherein said first arm of said asymmetric scroll extends less than approximately one hundred and twenty degrees about the circumference.

11. The AIPS system of claim 1, wherein said asymmetric scroll has a circumference, and wherein said second arm of said asymmetric scroll extends less than approximately two hundred and forty degrees about the circumference.

12. An asymmetric scroll having a circumference and configured to be coupled to a bifurcated duct system, said asymmetric scroll comprising:
- a first arm having a first arm length, said first arm configured to receive a first portion of scavenge air from a first plurality of turning vanes of the bifurcated duct system, wherein the first arm extends less than approximately one hundred and twenty degrees about the circumference; and
- a second arm having a second arm length that is different than the first arm length, said second arm configured to receive a second portion of scavenge air from a second plurality of turning vanes of the bifurcated duct system, wherein the second arm extends less than approximately two hundred and forty degrees about the circumference.

13. The asymmetric scroll of claim 12, wherein said first arm comprises a first end and said second arm comprises a second end, and wherein said first end and said second end define a gap between said first arm and said second arm.

14. The asymmetric scroll of claim 12, wherein said asymmetric scroll comprises an exhaust port that receives the scavenge air from each of said first arm and said second arm and that directs the scavenge air overboard.

15. The asymmetric scroll of claim 12, wherein said first arm defines a plurality of cross-sectional areas at each of a plurality of positions along the first arm length, and wherein each cross-sectional area of the plurality of positions increases in a direction of an exhaust port common to said first arm and said second arm.

16. The asymmetric scroll of claim 15, wherein each of the plurality of positions corresponds to an intersection of said first arm of said asymmetric scroll with one of the first plurality of turning vanes of the bifurcated duct system.

17. The asymmetric scroll of claim 12, wherein said second arm defines a plurality of cross-sectional areas at each of a plurality of positions along the second arm length, and wherein each cross-sectional area of the plurality of positions increases in a direction of an exhaust port common to said second arm and said first arm.

18. The asymmetric scroll of claim 17, wherein each of the plurality of positions corresponds to an intersection of said second arm of said asymmetric scroll with one of the second plurality of turning vanes of the bifurcated duct system.

* * * * *